United States Patent Office 3,308,141
Patented Mar. 7, 1967

3,308,141
PROCESS FOR PREPARING ACYLCYCLOPENTA-
DIENYL MANGANESE TRICARBONYL ESTER
CONDENSATION PRODUCTS
John Kozikowski, Walled Lake, Mich., and Michael Cais, Haifa, Israel, assignors to Ethyl Corporation, New York, N.Y., a corporation of Virginia
No Drawing. Original application Dec. 28, 1960, Ser. No. 78,820. Divided and this application May 3, 1965, Ser. No. 463,427
2 Claims. (Cl. 260—429)

This application is a division of parent application Serial No. 78,820, filed December 28, 1960.

This invention relates to a variety of organometallic compounds and the processes employed in their production. More specifically, this invention relates to compounds and processes involving the use of an acylcyclopentadienyl manganese tricarbonyl compound.

An object of our invention is to provide new organometallic compounds and processes for their preparation. A further object is to provide acylcyclopentadienyl manganese tricarbonyl derivatives and processes for their preparation. Additional objects will become apparent from a reading of the specification and claims which follow.

The objects of this invention are accomplished by reacting an acylcyclopetadienyl manganese tricarbonyl compound with an ester having the general formula:

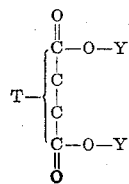

In the ester reactant shown above, Y is an alkyl group containing from one to about 8 carbon atoms and T is hydrogen or a hydrocarbon group which is connected to either one or the other of the two middle carbon atoms of the ester. T can be an alkyl group, an aralkyl group, or an aryl group and can contain from one to about 18 carbon atoms. There are formed from this reaction the following products:

(I)
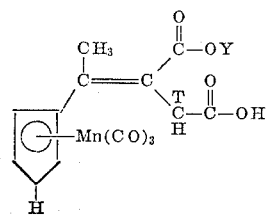

(II)
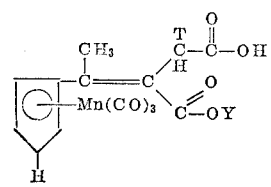

and
(III)
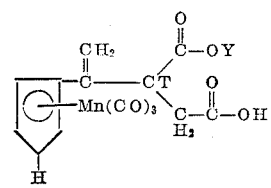

In the above general formulas of the reaction products, T may be hydrogen. Products I, II, and III as shown above, are the half-ester condensation products of an acylcyclopentadienyl manganese tricarbonyl compound and the ester reactant as defined above. In the course of the condensation, water is formed and this results in the hydrolysis of one of the ester groups in the ester reactant to convert it to an acid. To further illustrate this form of our invention, there are presented the following examples in which all parts and percentages are by weight unless otherwise indicated.

*Example I*

A three-necked flask equipped with a stirrer and a condenser, the top of which led to a source of nitrogen and reduced pressure, was evacuated, flame dried and filled with dry nitrogen. With nitrogen flowing, sodium hydride (21.6 grams) was washed into the flask with dry benzene (200 ml.) followed by a solution of acetylcyclopentadienyl manganese tricarbonyl (75 grams) in benzene (150 ml.). Freshly distilled diethyl succinate (160 grams) was then added. Nitrogen flow was stopped and the stirrer was started. A slight evolution of gas was observed for a few minutes which then stopped and during about 30 minutes of stirring no reaction appeared to take place. After that time, a sudden darkening in color was observed and strong evolution of gas began to take place. The reaction vessel was cooled in an ice-water bath and stirring was continued for 1 hour until the gas evolution slowed down. The cooling bath was removed and stirring was continued for another hour at room temperature when the gas evolution practically ceased. The reaction mixture was then cooled again with an ice-water bath and glacial acetic acid (60 ml.) was added dropwise with vigorous stirring. This was then followed by ether (300 ml.) and water (200 ml.) and stirring was continued for another half hour. Changes in color from brown to green and back to brown took place during the addition of the acetic acid and the ether. The mixture was then filtered to remove about 3.5 grams of a greenish precipitate, A. The filtrate was separated into the organic and aqueous layers. The aqueous layer was washed twice with ether and discarded. The ether washings were combined with the organic layer and extracted with 6×250 ml. of 5 percent sodium carbonate solution, B, then with 4×200 ml. 5 percent potassium hydroxide solution, C. The remaining organic layer D, was washed with 3×200 ml. water, dried over sodium sulfate, and distilled under vacuum to recover about 65 grams of diethyl succinate.

*Example II*

The sodium carbonate extract, B, from Example I was acidified with hydrochloric acid, extracted with ether, and the ether extract was dried over sodium sulfate and vaporated to dryness to obtain 85 grams of a viscous brown-reddish oil which semi-solidified on standing. Trituration with 100 ml. of an ether-petroleum ether solvent mixture (1:1 volume ratio) and filtration yielded 12 grams, $B_1$, of yellow crystals, M.P. 100–110° C.

One recrystallization from a carbon tetrachloride-benzene mixture gave crystals with a melting point of 119–120°C.

*Analysis.*—Calcd. for the alkylidene half ester $C_{16}H_{15}MnO_7$: C, 51.3; H, 4.01; Mn, 14.7. Found: C, 50.9; H, 3.88; Mn, 15.1 percent.

The filtrate obtained after separating the crystalline half ester was evaporated and the residue was triturated with ether/petroleum ether (1:1 volume ratio) as before to obtain on filtration another 12 grams of crystals, $B_2$. Repeating the procedure but triturating with carbon tetrachloride produced 2 grams of crystals, $B_3$, whose infrared spectrum was identical with that of $B_2$. Both $B_2$ and B₃, however, had similar but not identical infrared spectra with B₁. Repeating the CCl₄ procedure with the filtrate residue, there was obtained another 1 gram of crystals, M.P. 245° C. (dec), B₄. The infrared spectrum of B₄ was very different from those of B₁, B₂, and B₃. The filtrate from the last trituration was evaporated to obtain 50 grams of semi-solid yellow material, B₅, which was probably a mixture of isomeric half esters.

*Example III*

The crystalline half ester, B₁ (10 grams) was refluxed with barium hydroxide trihydrate (12 grams) in ethanol (200 ml.) and water (200 ml.) with continuous stirring for 18 hours. After cooling and filtering, the barium salt was collected, treated with dilute hydrochloric acid and extracted with ether. The ether extract was dried over sodium sulfate and evaporated to yield 9.2 grams of crystalline material, M.P. 120–125° C. Recrystallization from chloroform and chloroform/ether gave the analytical sample, M.P. 129–130° C.

*Analysis.*—Calcd. for dibasic acid, $C_{14}H_{11}MnO_7$: C, 48.5; H, 3.18; Mn, 15.9. Found: C, 48.8; H, 3.05; Mn, 16.1.

*Example IV*

The crystalline compound B₂ (10 grams) was hydrolyzed with barium hydroxide as described above, but reflux was only for 6 hours. After work-up as before, there was obtained 13 grams of barium salt from which was obtained 9.9 grams of viscous oily material, after acidification and ether extraction.

Trituration with ether/petroleum ether and filtration afforded 2.6 grams of crystals, M.P. 148–155° C. which upon recrystallization gave crystals of a dibasic acid having a melting point of 157–158° C.

*Analysis.*—Calcd. for $C_{14}H_{11}MnO_7$: C, 48.5; H, 3.18; Mn, 15.9. Found: C, 48.3; H, 3.11; Mn, 16.0 percent.

The filtrate from the initial trituration was evaporated to dryness, the residue dissolved in a minimum amount of chloroform and allowed to stand. There was obtained 5.5 grams of crystals M.P. 124–125° C. which when recrystallized from chloroform/ether gave crystals of M.P. 129–130° C., identical with the dibasic acid obtained from the hydrolysis of B₁ in Example III.

*Example V*

Thirty grams of the semi-solid yellow material, B₃, referred to in Example II, was hydrolyzed in 200 ml. of ethanol and 60 ml. of 25 percent potassium hydroxide and 100 ml. of water. The mixture was allowed to stand at room temperature for 64 hours after which it was refluxed for 4 hours. The volume was then reduced in half, acidified with hydrochloric acid and extracted with ether. The ether extract was boiled with Norit A, filtered and dried over sodium sulfate. The extract was then filtered again and the filtrate was heated to evaporate off the ether. There was obtained 24 grams of a yellow oil which solidified on standing. The oil was triturated with hot chloroform; the resulting solution was allowed to stand for ½ hour and it was then filtered. The residue was washed with chloroform and petroleum ether to yield 8 grams of yellow crystals having a melting point of 166–167° C. The crystals were recrystallized from ether/chloroform to give crystals having a melting point of 167–168° C. This material was another dibasic acid derivative of cyclopentadienyl manganese tricarbonyl as shown by I, II, and III, above. On analysis, there was found: C, 48.3; H, 3.17; Mn, 16.0. Calcd. for $C_{14}H_{11}MnO_7$: C, 48.5; H, 3.18; Mn, 15.9 percent.

The preparation of an acylcyclopentadienyl manganese tricarbonyl employed in the process of this invention, as well as the preparation of other related cyclopentadienyl manganese tricarbonyl compounds, is fully described in our copending application Serial No. 78,820, filed December 28, 1960.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead diethyldibutyllead and the like. When used as either a supplemental or primary antiknock, our compounds may be present in the gasoline in combination with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil. In addition, they may be employed as additives to solid fuels to control burning rate.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of bromoacetylcyclopentadienyl manganese tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Having fully defined the novel compounds of our invention, their mode of preparation and their many utilities, we desire to be limited only within the lawful scope of the appended claims.

We claim:

1. Process comprising reacting an acylcyclopentadienyl manganese tricarbonyl compound having the formula:

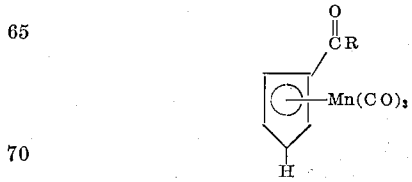

in which R is a hydrocarbon group containing from one to 20 carbon atoms and the cyclopentadienyl ring can be substituted with hydrocarbon groups containing from one to 8 carbon atoms with an ester having the formula:

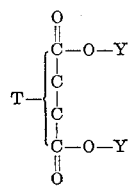

in which Y is an alkyl group containing from one to about 8 carbon atoms and T is a hydrocarbon group containing from one to about 18 carbon atoms and which is connected to one of the 2 middle carbon atoms in the ester molecule, said process being carried out in the presence of sodium hydride as a condensing agent.

2. Process comprising reacting acetylcyclopentadienyl manganese tricarbonyl with diethyl succinate, said process being carried out in the presence of sodium hydride as a condensing agent.

References Cited by the Examiner

Cais et al., Chem. and Ind. (London), Feb. 20, 1960, 202.

Cohen, Organic Chemistry, Part I, 4th edition, Longmans, Green & Co., New York (1923), page 197.

Daub et al., J. Am. Chem. Soc., 70, January 1948, p. 418–9 (QD 1.A5).

Krauch et al., Organic Name Reactions, John Wiley and Sons, New York, New York (1964), pp. 439–440 (QD 291.K7).

HELEN M. McCARTHY, *Acting Primary Examiner.*

TOBIAS E. LEVOW, *Examiner.*

T. L. IAPALUCCI, A. DEMERS, *Assistant Examiners.*